United States Patent [19]

Stange et al.

[11] 4,089,515
[45] May 16, 1978

[54] DOCUMENT STORAGE AND TRANSPORT APPARATUS

[75] Inventors: Klaus K. Stange, Pittsford; Richard E. Smith, Webster; Thomas J. Hamlin, Macedon; James R. Cassano, Penfield, all of N.Y.

[73] Assignee: Xerox Corporation, Stamford, Conn.

[21] Appl. No.: 794,483

[22] Filed: May 6, 1977

Related U.S. Application Data

[63] Continuation of Ser. No. 649,388, Jan. 15, 1976, abandoned.

[51] Int. Cl.² ............................................. B65H 5/22
[52] U.S. Cl. .......................................... 271/3; 271/9; 271/65; 271/195; 271/276; 271/DIG. 9; 355/24; 302/2 R
[58] Field of Search ................ 271/3, 9, DIG. 9, 276, 271/186, 196, 195, 65, 97, 236; 302/2 R, 29, 31; 355/24, 26, 3 R; 360/88, 91; 353/25, 27

[56] References Cited

U.S. PATENT DOCUMENTS

| | | | |
|---|---|---|---|
| 3,293,414 | 12/1966 | Barcia | 302/2 R X |
| 3,406,382 | 10/1968 | Wilmer | 271/9 X |
| 3,659,837 | 5/1972 | Umahashi | 271/9 |
| 3,705,413 | 12/1972 | Cronquist | 271/195 X |
| 3,788,636 | 1/1974 | Rehm et al. | 271/196 X |

Primary Examiner—Bruce H. Stoner, Jr.

[57] ABSTRACT

A system for presenting documents to a slit-scan xerographic exposure station includes a fluidic storage station having a housing in which a rack for storing documents is located. The rack includes a plurality of pockets in each of which a document may be stored, the rack being movable in a vertical direction so that any one of its pockets may be aligned with an opening in the housing. A fluid stream is used to move a document in a pocket aligned with the opening out of the storage apparatus and into engagement with transport apparatus. The transport apparatus includes a vacuum document drum which moves a document past the exposure station and, in one mode of operation, inverts the document prior to its return to a pocket at the station. In another mode of operation, the direction of travel of the drum is reversed after the document has been exposed and the document is returned without inversion. Another fluid stream is used to assist the return of an exposed document through the opening and into a pocket of the rack.

1 Claim, 7 Drawing Figures

U.S. Patent   May 16, 1978   Sheet 1 of 3   4,089,515
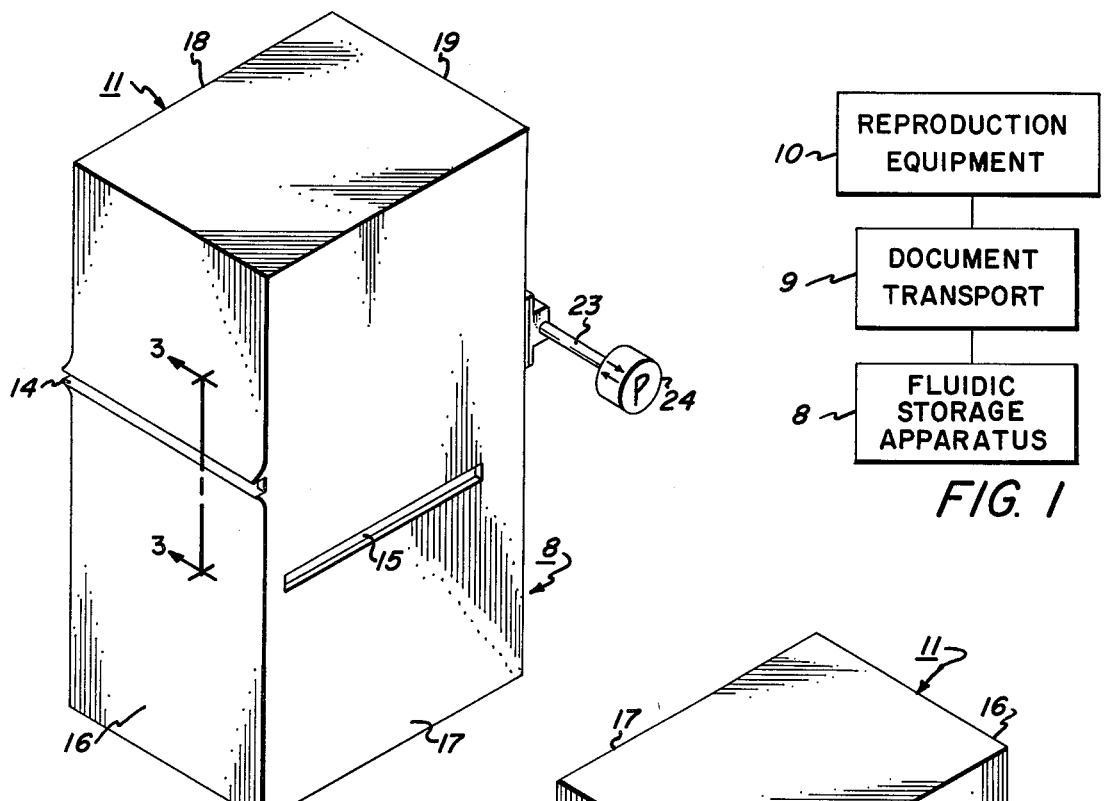
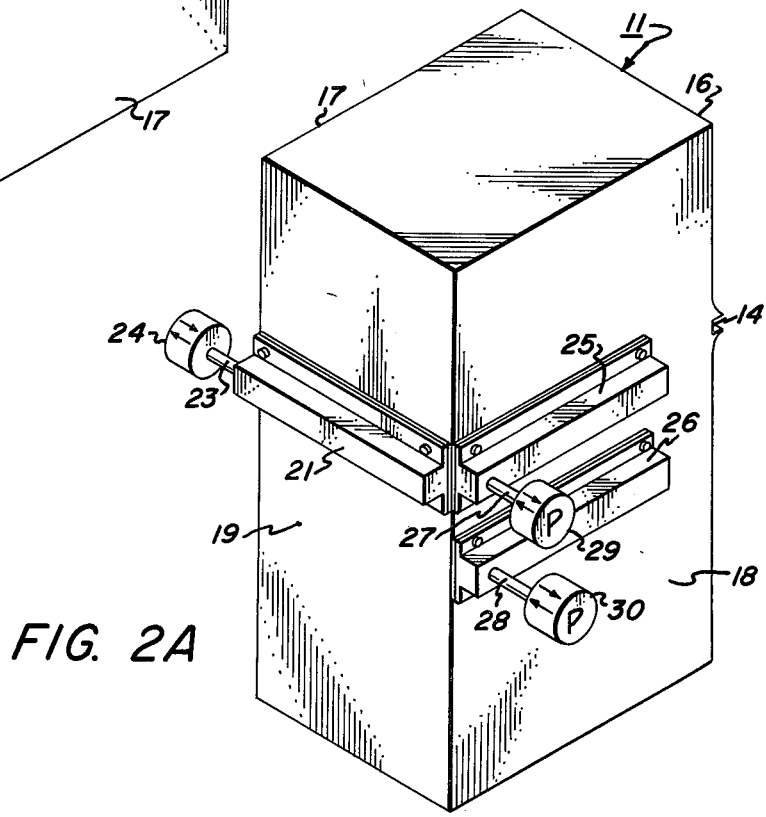
FIG. 1
FIG. 2
FIG. 2A

DOCUMENT STORAGE AND TRANSPORT APPARATUS

This is a continuation of application Ser. No. 649,388, filed Jan. 15, 1976, now abandoned.

The subject invention relates to apparatus for storing and feeding documents to an exposure station, such as is used in copying equipment. In addition, the invention relates to fluidic transports and document handling apparatus, such as is respectively disclosed in co-pending U.S. patent application Ser. No. 627,571, now abandoned, Pneumatic Registration Apparatus, filed on Oct. 31, 1975, on an invention by Klaus K. Stange, and co-pending U.S. patent application Ser. No. 638,590. Document Handling Apparatus, filed on Dec. 8, 1975, on an invention by Klaus K. Stange, et al now U.S. Pat. No. 4,059,260, the applications having been assigned to the assignee herein, Xerox Corporation.

The public is aware of apparatus for storing and feeding documents wherein documents are stored in a bin and drive rollers engaging the top or bottom of the stack serially discharge the documents from the bin. Documents thus handled may be transported to an exposure station, such as is used in xerographic machines, and thereafter are usually moved into a collecting tray. The public is also aware of xerographic systems wherein a document drum is used to move a document past an exposure station. In such systems a transported document is returned to an operator or bin.

It is an object of the present invention to provide document handling apparatus for storing documents in superposed fashion and for serially delivering the documents, fluidically, to an exposure station.

It is another object of the present invention to provide document handling apparatus for fluidically feeding documents from a storage station to an exposure station and for fluidically moving documents received from the exposure station back into the storage station.

Yet another object of the present invention is to provide document handling apparatus wherein any one of documents stored in superposed fashion may be withdrawn, exposed, and returned inverted or without inversion.

Briefly, the invention disclosed herein provides apparatus for storing and feeding documents past an exposure station located adjacent an arcuate path. The apparatus includes: (a) a rack having a plurality of superposed pockets for storing documents; (b) means for moving any one of said pockets to a predetermined location; (c) fluidic means for moving documents into or out of a pocket at said predetermined location; and (d) means for receiving a document moved out of a pocket at said predetermined location, for moving a received document through said arcuate path and for discharging the document, the discharged document being moved into a pocket by the fluidic means.

When the exposure station is a part of reproduction apparatus, multiple copies of a document may be made by repeatedly moving the document through the arcuate path. Further, copies of both sides of a document may be made if a received document is moved through the arcuate path, is returned to a pocket, and is received a second time for movement through the path.

Additional objects and features of the invention will become apparent by reference to the following description in conjunction with the accompanying drawings, in which:

FIG. 1 is a block diagram of a system including reproduction equipment and apparatus for storing and feeding documents past an exposure station of the equipment, according to the invention;

FIG. 2 and 2a are perspective views of storage apparatus, according to the invention;

An embodiment of apparatus for storing and feeding documents past an exposure station of reproduction equipment, according to the invention, is shown in block diagram form in FIG. 1. In general, the apparatus includes a fluidic storage apparatus 8 which is used to store documents and to serially feed documents to a document transport 9. In turn, the transport moves the documents past an exposure station of reproduction equipment 10, such as a slit-scan xerographic machine. After exposure, the documents are moved back into the storage apparatus. In moving from storage apparatus 8 to the exposure station and back, the documents follow an arcuate path.

Figure 3:
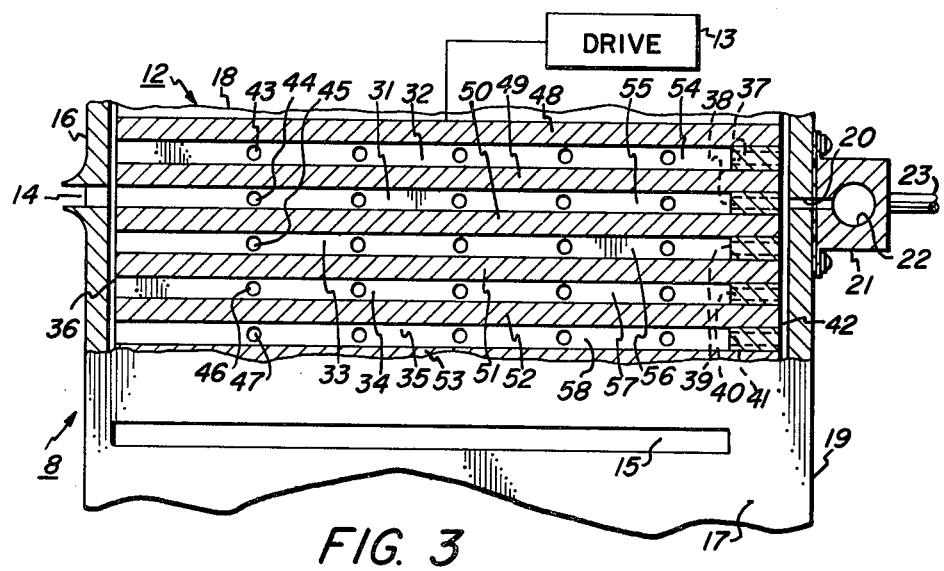
FIG. 3 is a partial side plan view of the storage apparatus, a section of the view having been taken along lines 3—3 in FIG. 2.

Referring to FIGS. 2, 2a, and 3, apparatus for storing documents 8 includes a generally rectangular housing 11 within which there is mounted a rack 12 and means 13 for moving the rack up and down. Housing 11 includes a horizontal opening 14 on a wall 16 and a horizontal opening 15 on a wall 17. Each of walls 18 and 19 includes a horizontally disposed slot 20 (only one is shown) at the same level as the opening 14 and wall 18 includes a horizontally disposed slot at the same level as the opening 15. Wall 19 supports a manifold 21 having a chamber 22 communicating with slot 20 and manifold 21 is coupled by a conduit 23 to a reversible pump 24. Similarly, wall 18 supports manifolds 25 and 26, each having a chamber communicating with one of the slots. Manifolds 25 and 26 are coupled, respectively, by conduits 27 and 28 to vacuum pump 29 and reversible pump 30.

Figure 4:
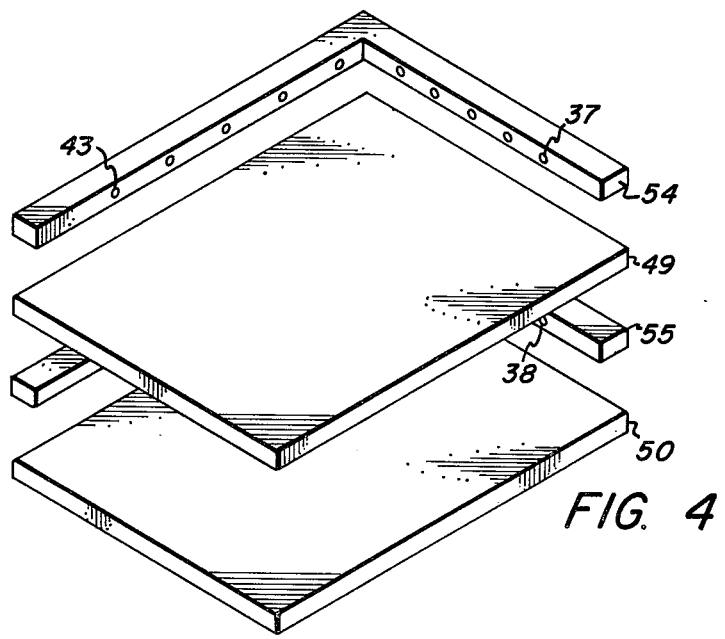
FIG. 4 is a partial exploded view of a storage rack of the storage apparatus.

Rack 12 is a rectangular structure having a plurality of superposed pockets 31–35 (not all shown) horizontally extending from a front side of the structure 36. In addition, the rack includes a plurality of sets of holes 37–41 (not all shown), each set extending through the back side 42 of the structure and communicating with a different one of the pockets; and a plurality of groups of holes 43–47, each group extending through a side wall of the structure and communicating with a different one of the pockets. As shown in FIGS. 3 and 4, the rack may be manufactured from rectangular plates 48–53 (not all shown); L-shaped spacers 54–58 (not all shown) interposed between plates, each of the spacers including one of said sets of holes and one of the group of holes; and means for securing the spacers and plates together. Typically, the spacers and plates are fixed to each other with an adhesive; but, bolts (not shown) extending vertically through the plates and spacers and nuts cooperating therewith may be used.

Opening 15 (see FIG. 3) is located such that when the rack 12 is in its lowermost position the top pocket of the rack is aligned therewith and its corresponding group of holes is aligned with the lower slot in wall 18. Therefore, if a vacuum pressure is applied to manifold 26 fluid is drawn through the opening, through the pocket, and through a group of holes. As a result, if a document is presented to the opening 15 it is moved into the pocket. If the rack 12 is moved upwardly in increments corresponding to the distance between adjacent pockets, the rack may be filled with documents. Opening 14 is located such that when rack 12 is in its uppermost position the bottom pocket of the rack is aligned therewith. As a result, the group of holes associated with the bottom pocket is aligned with the upper slot in wall 18 and the corresponding set of holes associated with the bottom pocket is aligned with slot 20.

As more fully described below, if fluid pressure is applied to manifold 21 when a pocket carrying a document is aligned with opening 14, fluid is injected through a set of holes into a pocket and exits through opening 14, thereby moving a document into the document transport. Alternatively, with vacuum pressure applied to manifolds 21 and 25, documents discharged from the document transport may be registered with the spacer corresponding to a pocket in alignment with opening 14.

Figure 5:
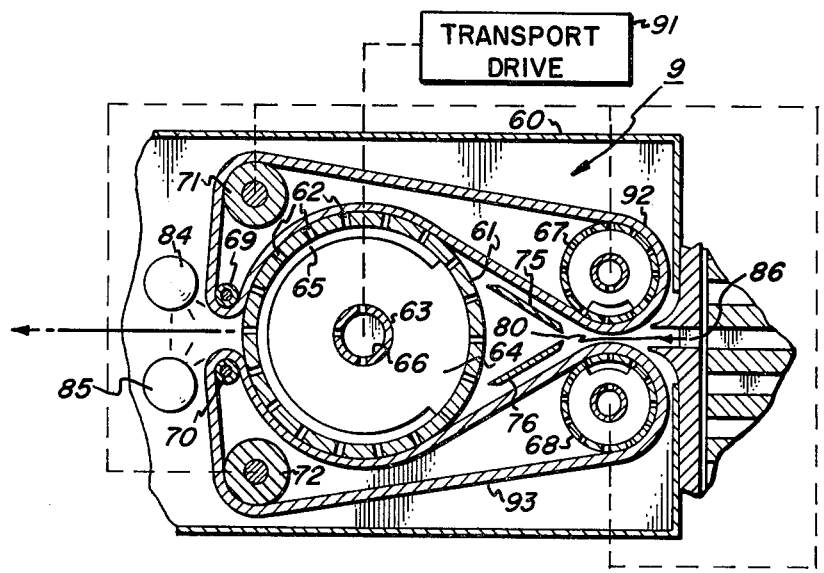
FIG. 5 is a cross sectional view of a document transport of the apparatus.
Figure 6:
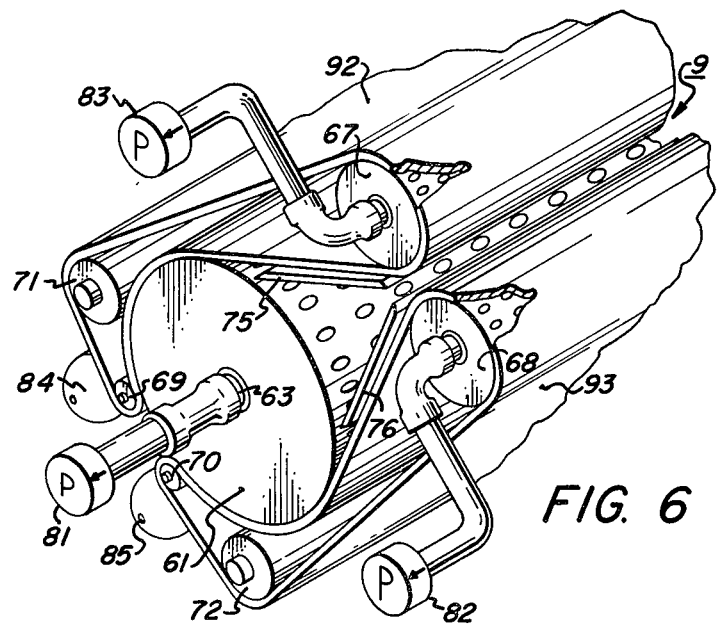
FIG. 6 is a partial perspective view of the transport.

Referring to FIGS. 5 and 6, transport apparatus 9 is located within a housing 60 and includes a hollow document drum 61 having a number of ports 62 extending through its cylindrical surface. Drum 61 is rotatably mounted on a shaft 63 supporting a cylindrical member 64 having a radially projecting land portion and the shaft is supported by the housing 60. The radial portion is in sliding contact with the inner surface of drum 61 and, as may be seen, member 64 provides an arcuate chamber 65 inside the drum. Shaft 63 includes a conduit 66 having axially and radially extending segments. The radial segments communicate with the chamber 65 and the axial section is coupled to a vacuum pump 81 which when turned on provides along an arcuate section of the cylindrical surface of the drum a vacuum pressure suitable for holding documents. The axis of shaft 63 is horizontally disposed at the same level as an opening 86 in the housing 60 and opening 15, and above and below the opening there is mounted, respectively, vacuum rollers 67 and 68. Rollers 67 and 68 are similar to the vacuum drum and are similarly mounted so as to be capable of providing along facing arcuate sections a vacuum pressure. The rollers and the drum differ in that the drum is larger and its arcuate vacuum section subtends a larger number of degrees. Housing 60 also supports a pair of idler rollers 69 and 70 which are equidistant from an imaginary plane passing through the axis and opening 86 and are located on a region of drum 61 furthest from the vacuum rollers 67 and 68. In addition, housing 60 also supports a pair of drive rollers 71 and 72. Drive roller 71, idler roller 69, and vacuum roller 67 support a porous belt 92 in contact with an arcuate path adjacent drum 61; and drive roller 72, idler roller 70, and vacuum roller 68 support another porous belt 93 in contact with another arcuate path adjacent drum 61. The drive rollers 71 and 72, the document drum, and the vacuum rollers 67 and 68 are mechanically linked to a power source 91 such that belt sections in contact with drum 61 move therewith with the same tangential velocity and, therefore, it will be appreciated that the vacuum rollers always rotate in opposite directions. A pair of guide members 75 and 76 are located adjacent to the belts 92 and 93, respectively, in the region between the vacuum rollers and the drum to assist documents moving to or away from the drum. Adjacent the idler rollers 69 and 70 there is located a pair of exposure lamps 84 and 85 for lighting an arcuate path through which the drum surface or a document thereon passes and those skilled in the art of xerography will appreciate that this arrangement constitutes an exposure station which may be used as part of a reproduction system.

Operatively, if no vacuum pressure is applied to roller 68 by pump 82 and vacuum pressure is supplied to roller 67 by pump 83, when a document enters the transport apparatus 9, as indicated by arrow 80 in FIG. 5, vacuum pressure provided through belt 92 moves the document against the belt, and the document is guided into contact with drum 61. In FIG. 5 drum rotates counter clockwise and moves the document around past the exposure station. As the leading edge of the document passes the exposure station, it is engaged by belt 93 and is guided towards vacuum roller 68. With no vacuum pressure at roller 67 and vacuum pressure at roller 68, the document is fed back into a pocket, the document having been inverted. Alternatively, after a document has been exposed, if the direction of rotation of the drum, belt, etc., are reversed, the document may be guided back into a pocket without inversion. If desired, when a document is on the drum, the drum may be rotated back and forth to periodically move the document past the exposure station. In this mode of operation, multiple copies of the document may be made by reproduction equipment. In connection with this mode of operation, it should be appreciated that member 64 can be modified to selectively provide a vacuum pressure in the region presently occupied by the land, in which event the document may simply be rotated to provide multiple copies of a document.

Documents returned to pockets are acted on by a fluid stream created with vacuum pressure provided by pumps 24 and 29 and are registered against the spacer of the pocket. This mode of operation is beneficial because documents delivered are not randomly oriented so as to create situations wherein documents rub against the inner walls of the housing 11 and are damaged.

To remove documents from pockets, the rack is stepped so that the pockets are sequentially aligned with opening 15, and fluid injected into the aligned pockets by pump 30 drives the documents out. However, it should be noted that opening 15, pump 30, and manifold 28 may be dispensed with by providing on wall 17 a door which may be opened for loading and unloading of documents. In such an arrangement, it is preferred that the door be manufactured from a transparent material, such as glass, to enable an operator to look into the housing for malfunctions.

As previously stated, documents are presented to the document transport by vertically stepping the rack discrete increments to align a pocket with opening 14 and by operating pump 24 so that it causes a fluid to move a document through opening 14. Therefore, drive 13 must be capable of moving the rack in increments. As is well known to those skilled in the elevator art, this may be accomplished with motors, pulleys, and sensors, or with rack and pinion drives.

It is to be understood that the description herein of a preferred embodiment, according to the invention, has been set forth as an example thereof an is not to be construed or interpreted to provide limitations on the claims which follow and define the invention.

What is claimed is:

1. Apparatus for storing and feeding selected sides of selected documents past an exposure station for copying the documents comprising:

(a) document exposure drum means providing said exposure station;
(b) a rack having a plurality of superposed pockets for storing documents;
(c) means for moving any selected one of said pockets to a predetermined location adjacent said document exposure drum;
(d) fluidic means for fluidicly moving a selected document into or out of a selected pocket and into and out of said document exposure drum means at said predetermined location including a plurality of fluid apertures associated with said pockets;
(e) said document exposure drum means including means for receiving a document moved out of a selected pocket at said predetermined location, means for moving a received document through an arcuate path, and means for discharging the document back into said same pocket by said fluidic means;
(f) wherein said document exposure drum includes a rotatable drum, means for providing a vacuum pressure for holding a document on an arcuate surface section of said drum, and means for rotating said drum to move a document through said arcuate path to and from said selected pocket;
(g) wherein said means for rotating said drum includes means for selectively reversing the rotation of said drum to selectively return a document to the selected pocket in the same or inverted orientation from which it was received from said pocket.

* * * * *